(No Model.)

F. A. REICHARDT.
CLASP FOR SURGICAL INSTRUMENTS.

No. 426,959.  Patented Apr. 29, 1890.

WITNESSES:
F. W. Rubien
C. E. McDonald

INVENTOR
F. A. Reichardt,
BY Singer & Ebner
ATTORNEYS.

UNITED STATES PATENT OFFICE.

FERDINAND A. REICHARDT, OF NEW YORK, N. Y.

CLASP FOR SURGICAL INSTRUMENTS.

SPECIFICATION forming part of Letters Patent No. 426,959, dated April 29, 1890.

Application filed May 17, 1889. Renewed April 4, 1890. Serial No. 346,616. (No model.)

*To all whom it may concern:*

Be it known that I, FERDINAND A. REICHARDT, a citizen of the United States, residing at the city of New York, in the county of New York and State of New York, have invented a new and useful Improvement in Clasps for Surgical Knives, Hooks, and Similar Instruments, of which the following is a specification.

My invention relates to that class of instruments in which a blade is pivoted in a handle, and its object is to firmly clasp the blade when open, so that it will be held steadily open.

The nature of the invention consists in the details of combination and construction, substantially as illustrated in the accompanying drawings, hereinafter described, and subsequently pointed out in the claim.

Figure 1:
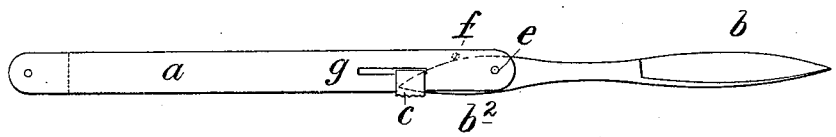
Figure 2:
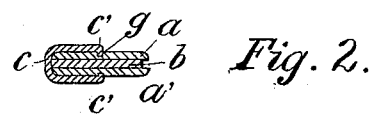
Figure 3:
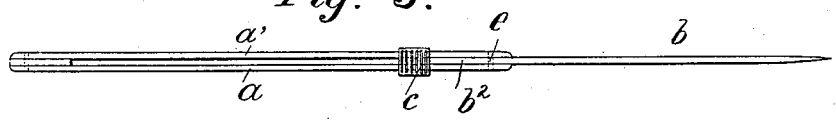
Figure 4:
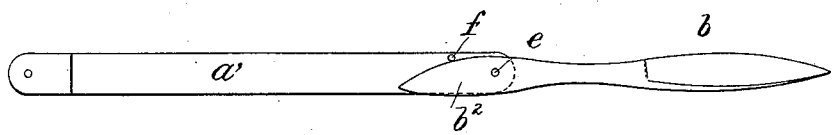

Figure 1 is a side view of a surgical knife constructed according to my invention. Fig. 2 is a sectional view of the same, taken through the sliding clasp $c$. Fig. 3 is a back view of the same. Fig. 4 is a longitudinal sectional view of the same.

$a\,a'$ designate the handle, and $b\,b^2$ the blade, which is pivoted in the handle at $e$.

$f$ designates a stop against which the tine $b^2$ of the blade rests when in an open position, as is illustrated in Figs. 1 and 4.

In each side of the handle is cut a short longitudinal groove, which is parallel to the edges of the handle and designated by $g$.

$c$ designates a sliding clasp constructed and arranged to embrace the back part of the handle and slide on the handle with its edges on the groove $g$, as illustrated in Figs. 1 and 2. The outer surface of this slide may be serrated, as illustrated in Fig. 3, the whole device to be substantially as illustrated in the drawings.

To use my invention, the blade $b\,b^2$ is to be opened out until the tine $b^2$ rests upon the stop $f$, as is illustrated in Figs. 1 and 4, and then the clasp $c$ is slipped up on the handle until it binds on the outer convex edge of the tine $b^2$. It will then be found that the blade of the knife will be firmly and securely held in open position. When the clasp is slipped back down upon the handle, so as to clear the tine $b^2$, the blade will be free to be closed up in the handle.

It is evident that bistouries, scalpels, and a very great variety of surgical instruments may be constructed and operated successfully in this same way, and especially it gives, in the case of all cutting-instruments to which it is applied, a sure and reliable rest for the finger of the operator. It is also evident that this same device may be successfully applied to double knives and hooks, so that there shall be a clasp, substantially as described, for each blade, which may be so arranged that while one blade is held open the other may be held in a closed position.

What I claim as my invention, and desire to secure by Letters Patent, is—

The combination, with the handle of a surgical instrument formed with a groove in each side parallel to the length thereof and a blade permanently riveted in said handle, of a clasp sliding with its edges in said groove and adapted to hold said blade in an open position, and a serrated finger-rest formed on said clasp, all substantially as and for the purpose set forth.

In witness whereof I hereunto set my hand in presence of two witnesses.

FERDINAND A. REICHARDT.

Witnesses:
F. W. RUBIEN,
C. E. McDONALD.